United States Patent
Li et al.

(10) Patent No.: US 8,963,810 B2
(45) Date of Patent: Feb. 24, 2015

(54) LED DISPLAY SYSTEMS

(75) Inventors: Eric Li, Milpitas, CA (US); Chun Lu, San Jose, CA (US); Shahnad Nadershahi, Simi Valley, CA (US); Shang-Kuan Tang, Fremont, CA (US)

(73) Assignee: SCT Technology, Ltd., Grand Cayman (KY)

( * ) Notice: Subject to any disclaimer, the term of this patent is extended or adjusted under 35 U.S.C. 154(b) by 707 days.

(21) Appl. No.: 13/170,181

(22) Filed: Jun. 27, 2011

(65) Prior Publication Data

US 2012/0327128 A1    Dec. 27, 2012

(51) Int. Cl.
*G09G 3/28*     (2013.01)
*G09G 3/32*     (2006.01)

(52) U.S. Cl.
CPC .. *G09G 3/32* (2013.01); *Y02B 20/42* (2013.01)
USPC ............... 345/69; 345/1.1; 345/82; 345/100; 345/204; 345/600; 345/690; 345/698

(58) Field of Classification Search
None
See application file for complete search history.

(56) References Cited

U.S. PATENT DOCUMENTS

| | | | | |
|---|---|---|---|---|
| 5,272,382 | A * | 12/1993 | Heald et al. ............... | 307/66 |
| 5,552,677 | A | 9/1996 | Pagones | |
| 6,078,361 | A * | 6/2000 | Reddy ..................... | 348/558 |
| 6,339,415 | B2 | 1/2002 | Ishizuka | |
| 6,747,617 | B1 | 6/2004 | Kawashima | |
| 7,015,882 | B2 | 3/2006 | Yumoto | |
| 7,019,721 | B2 | 3/2006 | Thielemans et al. | |
| 7,126,568 | B2 | 10/2006 | LeChevalier | |
| 7,277,073 | B2 | 10/2007 | Hattori | |
| 7,385,575 | B2 | 6/2008 | Seto | |
| 7,446,744 | B2 | 11/2008 | Klein et al. | |
| 8,143,794 | B1 | 3/2012 | Li et al. | |
| 8,334,660 | B2 | 12/2012 | Li et al. | |
| 8,525,424 | B2 | 9/2013 | Li et al. | |
| 2002/0011998 | A1 * | 1/2002 | Tamura ...................... | 345/204 |
| 2003/0026368 | A1 * | 2/2003 | Subramoniam et al. ...... | 375/354 |
| 2003/0090455 | A1 | 5/2003 | Daly | |
| 2003/0156101 | A1 | 8/2003 | LeChevalier | |
| 2004/0207315 | A1 * | 10/2004 | Robbie et al. ................. | 313/504 |
| 2005/0052141 | A1 | 3/2005 | Thielemans et al. | |
| 2005/0140610 | A1 | 6/2005 | Smith et al. | |
| 2005/0202851 | A1 * | 9/2005 | Yamamoto et al. .......... | 455/566 |
| 2006/0033443 | A1 * | 2/2006 | Ishii et al. ................. | 315/87 |
| 2006/0038740 | A1 * | 2/2006 | Jung et al. .................... | 345/1.1 |
| 2007/0152923 | A1 | 7/2007 | Baik et al. | |
| 2008/0111773 | A1 | 5/2008 | Tsuge | |
| 2008/0204431 | A1 * | 8/2008 | Chung et al. ................. | 345/204 |
| 2011/0163941 | A1 | 7/2011 | Li | |
| 2012/0176062 | A1 | 7/2012 | Sato et al. | |
| 2012/0327129 | A1 | 12/2012 | Li et al. | |

* cited by examiner

*Primary Examiner* — Jesus Hernandez (74) *Attorney, Agent, or Firm* — Novick, Kim & Lee, PLLC; Allen Xue (57) ABSTRACT

An LED display system comprises an LED array and an LED driver circuit. An LED driver circuit comprises components including a phase lock loop, a pulse width modulation engine, a configuration register, a gain adjustable fast charge current source, and a serial input/output interface. The components in this driver circuit may be integrated on a same chip. The LED array may be arranged in a common cathode configuration.

2 Claims, 7 Drawing Sheets

LED DISPLAY SYSTEMS

THE TECHNICAL FIELD

The present disclosure relates generally to LED display systems, which comprise an LED array and an LED driver, and more particularly, this disclosure relates to an integrated circuit that drives the LED array.

BACKGROUND

In recent years, devices and applications involving LEDs (i.e., light emitting diodes) are gaining popularity. Such devices and applications range from light sources for general illumination, signs and signals, to display panels, televisions, etc. Regardless of the applications, LED driver circuits are used in supplying power to the LEDs.

An LED panel generally refers to a device that comprises an array of LEDs that are connected together or a plurality of sub-modules, each sub-module has one such LED array. LED panels usually employ arrays of LEDs of single or different colors. When individual LEDs are used in certain display applications, each LED usually corresponds to a display pixel pitch. An RGB LED unit refers to a cluster of three LEDs, namely, a red LED, a green LED, and a blue LED. When RGB LED units are used in certain display applications, each RGB LED dimension unit corresponds to a display pixel pitch. Surface mounted RGB LED units usually have four pins, one pin for each of the red, green, and blue LEDs and another pin for either a common anode or a common cathode.

Traditionally, LED arrays are often arranged in a common anode scan configuration, in which the anode of the LEDs are operatively connected to a power source via a switch element while the cathode of the LEDs are tied to output of current drivers. In such a configuration, an NMOS driver is often used as the current sink. An NMOS is preferable over a PMOS because NMOS has a larger current capacity and a lower Rds(on) for a given design geometry.

In a common anode configuration, all RGB LEDs are connected to the same power supply and have a same supply voltage. As is well known in the art, the red LED forward voltage is significantly lower than that of green and blue LEDs. Using a same supply voltage for the red, green, and blue LEDs requires adjusting the supply voltage to match the forward voltage drop of individual LEDs, for example, by installing a bias resistor between the power supply and the LED. Consequently, a significant amount of energy is released as heat on the resistor. For example, if the supply voltage is 5 volts, since the forward voltage drop of a red LED is about 2.0 volts, approximately 60% of the energy is lost as heat. Such heat generation not only wastes energy, but also complicates the design of driver circuitry, e.g., increasing the demand for heat removal.

It is often desirable to have a display of high resolution. The smaller the size of a pixel pitch is, the higher the resolution of the display may have. An LED display system has many components, e.g., a constant current driver, a decoder, power MOSFETs to control scan line switching, and biased resistor for some LEDs (such as red LEDs) to reduce LED driver operating voltage. These components are often mounted on a PCB (printed circuit board) as discrete parts, not only increasing the manufacturing cost by increasing the number of layers in PCB, but also making it difficult to curb noise on the PCB and to reduce the pixel pitch size. Having multiple discrete parts in the LED display system also increases the difficulties in controlling other performance parameters such as the timing of the LEDs, the elimination of parasitic capacitance (which may lead to ghost images), etc.

SUMMARY OF INVENTION

The current disclosure provides devices and methods that reduces the power consumption and the number of discrete parts in a LED display system. In this disclosure, an LED driver IC refers to an integrated circuit that controls and drives the LED array. Components in an LED driver IC are integrated into a driver chip. An LED driver circuit may refer to either an LED driver IC in which all components in the circuit are integrated on a single chip, or a driver circuit having parts on a plurality of chips, or a driver circuit having parts on one or a plurality chips and one or a plurality of PCB boards.

According to one embodiment of the current disclosure, a driver circuit for LEDs includes: a phase lock loop, a pulse width modulation engine, a configuration register, a gain adjustable fast charge current source, and a serial input/output interface. The phase lock loop is operatively connected to the serial input/output interface. The phase lock loop provides a global clock signal. The pulse width modulation (PWM) engine is operatively connected to the serial input/output interface. The PWM engine receives gray scale values from the serial input/output interface. It also receives a global clock signal from the phase lock loop and generates a PWM signal for the gain adjustable fast charge current source. The configuration register is operatively connected to serial input/output interface and gain adjustable fast charge current source. The configuration register stores driver circuit settings. The gain adjustable fast charge current source is operatively connected to the configuration register, the serial input/output interface, and the plurality of PWM engines; it provides a current output to drive an LED array. The serial input/output interface is operatively connected to the phase locked loop, the configuration register, the PWM engines, and the gain adjustable fast charge current sources. This serial input/output interface provides driver circuit settings to the configuration register. It also provides gray scale values to the pulse width modulation engines, and in addition, it provides global gain adjustment settings to the gain adjustable fast charge current sources.

According to another embodiment of the current disclosure, an LED display system includes a plurality of LEDs arranged into an LED array with rows and columns, each LED having an anode and a cathode. The system further includes a plurality of common cathode nodes, each connected with cathodes of the LEDs in a same row. The system further includes a plurality of common anode nodes, each connected with anode of the LEDs of a same color in a same column and an integrated driver circuit. The integrated driver circuit further includes a phase lock loop, a plurality of pulse width modulation engines, a configuration register, a plurality of gain adjustable fast charge current sources, and a serial input/output interface. The phase lock loop is operatively connected to the serial input/output interface; it provides a global clock signal. The plurality of pulse width modulation (PWM) engines is operatively connected to the serial input/output interface, they receive gray scale values from the serial input/output interface, they also receive a global clock signal from the phase lock loop. The PWM engines generate PWM signals for the plurality of gain adjustable fast charge current sources. The configuration register is operatively connected to the serial input/output interface and the gain adjustable fast charge current source. It stores driver circuit settings. The plurality of gain adjustable fast charge current sources are operatively connected to the configuration register, the serial input/output interface, and the plurality of PWM engines. These current sources provide a plurality of current outputs, where each current output is operatively connected to a common anode node in the LED array. The serial input/output interface is operatively connected to the phase locked loop, the configuration register, the PWM engines, and the gain adjustable fast charge current sources. This serial input/output interface provides driver circuit settings to the configuration register. It also provides gray scale values to the pulse width modulation engines, and in addition, it provides global gain adjustment settings to the gain adjustable fast charge current sources.

According to another aspect of the present disclosure, a method of driving LEDs using an integrated driver circuit comprises the step of connecting an array of LEDs to an integrated driver circuit, where the LED array comprises columns of red, green, and blue LEDs having their anodes connected to red, green, and blue common anode nodes respectively, and the integrated driver circuit comprises a plurality of power sources. The method further comprises steps of operatively connecting a power source to a common anode node and setting the voltage of the power source connected to a red common anode node at 1.8 volts to 2.6 volts. The method further comprises step of setting the voltage of the power source connected to a green common anode node or a blue common anode node at 2.6 volts to 3.6 volts.

In still another aspect of the present disclosure, a method of driving LEDs using an integrated driver circuit comprises the step of connecting an array of LEDs to an integrated driver circuit, where the LED array comprises columns of red, green, and blue LEDs having their anodes connected to red, green, and blue common anode nodes respectively, and the integrated driver circuit comprises a plurality of power sources. The method further comprises steps of operatively connecting a power source to a common anode node and setting the voltage of the power source connected to a red common anode node at 1.8 volts to 2.6 volts. The method further comprises step of setting the voltage of the power source connected to a green common anode node or a blue common anode node at 2.6 volts to 3.6 volts. The integrated driver circuit further comprises a phase lock loop, a plurality of pulse width modulation engines, a configuration register, a plurality of gain adjustable fast charge current sources, and a serial input/output interface. The method further comprises the steps of providing a global clock signal with the phase lock loop, storing driver circuit settings in a SRAM, loading driver circuit settings into the configuration register, loading gray scale values and the global clock signal to the pulse width modification engine, generating PWM signals for the plurality of gain adjustable fast charge current sources, loading DOT correction settings into memory within a gain adjustable fast charge current source circuit and providing a stable current to the LEDs based on pulse-width modification engines output signal.

DESCRIPTIONS OF DRAWINGS

The teachings of the present disclosure can be readily understood by considering the following detailed description in conjunction with the accompanying drawings.

DETAILED DESCRIPTION OF THE EMBODIMENT

The Figures (FIG.) and the following description relate to the embodiments of the present disclosure by way of illustration only. It should be noted that from the following discussion, alternative embodiments of the structures and methods disclosed herein will be readily recognized as viable alternatives that may be employed without departing from the principles of the claimed inventions.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1A:
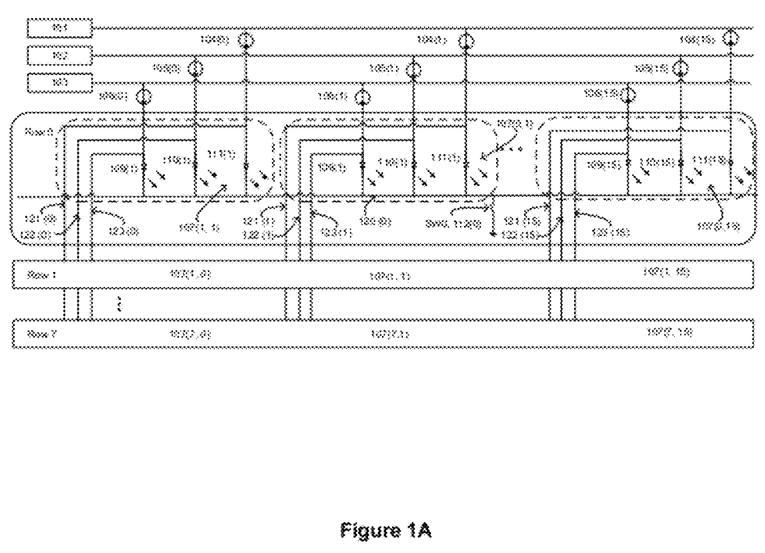
FIG. 1A is a diagram illustrating an embodiment of an LED array according to the current disclosure.

FIG. 1A is a diagram showing an LED array according to one embodiment of the current disclosure, i.e., a common cathode configuration. The LED array in the LED panel system comprises an 8×16 matrix of RGB LED units 107, power sources 101, 102, and 103, and a plurality of constant current drivers 104, 105, and 106. Letter "m" represents a row number in the matrix, which ranges from 0 to 7. Letter "n" represents the column number in the matrix, which ranges from 0 to 15. These letters placed in parenthesis following a reference numeral indicates the location of the component in the LED array. For example, 107(2, 4) is an RBG LED unit located at the intersection of row 2 and column 4.

The RGB LED unit 107 comprises a red LED 109, a green LED 110, and a blue LED 111 packaged into one integrated part. The RGB LED unit 107 has four output pins, one of which is a common cathode pin (i.e., the cathode shared among the red, green, and blue LEDs), the other three are the anodes of red, green and blue LEDs. The common cathode pin is connected to a common cathode node 120. In the embodiment shown in FIG. 1A, a common cathode node 120 connects the cathodes of the RGB LED units in a same row. The numeral 120(m) indicates a common cathode node for the m-th row.

The anodes of red LEDs in a same column of the matrix are connected to a common anode node 121 ("the red LED common anode node"), which is connected to constant current driver 104, where n is the column number and ranges from 0-15. The driver 104 is in turn powered by the power source 101 ($P_{Red}$), having a voltage $V_{DD\_Red}$. The anodes of green LEDs in the same column of the array are connected to a common anode node 122 ("the green LED common anode node"), which is connected to constant current driver 105. The driver 105 is connected to the power source 102 ($P_{Green}$), having a voltage $V_{DD\_Green}$. Likewise, the anodes of blue LEDs in the same column of the array are connected to a common anode node 123 ($P_{Blue}$), which is connected to constant current driver 106. The driver 106 is further connected to the power source 103, having a voltage $V_{DD\_Blue}$. Therefore, drivers 104(n), 105(n), and 106(n) are respectively common current drivers for red, green, and blue LEDs in the n-th column. In this application, a "channel" or an "LED channel" corresponds to one common anode node.

In the configuration depicted in FIG. 1A, the voltages for power sources 101, 102, and 103 can be individually set in accordance with the different forward voltages of the red, green, and blue LEDs—$V_{F-Red}$, $V_{F-Green}$, and $V_{F-Blue}$,—respectively. The $V_{DD}$ of a particular path can be expressed in the following general formula:

$$V_{DD}=N*V_F+V_{DSP}+V_{DSN}$$

wherein N stands for the number of LEDs connected to a same common anode node, $V_{DSP}$ stands for the voltage between the drain and source of a PMOS that is in the same channel as the common anode node, and $V_{DSN}$ stands for the voltage between the drain and source of an NMOS that is in the same channel as the common anode node. In this case, $V_F$ represents the mathematical average of the forward voltage of all LEDs that are connected to the common anode node.

When $V_{DSP}$ and $V_{DSN}$ for various red, green, or blue LED channels (i.e., a channel comprise the red common anode node, or the green common anode node, or the blue common anode node) are of a same or similar value, and each LED channel has N number of LEDs, and the LEDs in the same channel have the same forward voltage, the following equations are true:

$$V_{DD\_Blue}-V_{DD\_Red}=N(V_{F\_Blue}-V_{F-Red})$$

$$V_{DD\_Green}-V_{DD\_Red}=N(V_{F\_Green}-V_{F-Red})$$

For LEDs used in small pixel pitch applications, e.g., high resolution displays, $V_{F-Red}$ ranges, for example, from 1.8 volts to 2.4 volts while $V_{F-Green}$ and $V_{F-Blue}$ range, for example, from 2.6 volts to 3.6 volts. The differences among the forward voltages allow one to chose $V_{DD}$ based on the forward voltage of LEDs in a particular LED path. In contrast, in configurations where one power source supplies the whole array of LEDs, all the anodes of the LEDs are electrically connected to the same power source (i.e., a common anode configuration), $V_{DD}$ is the same for all LEDs paths. The voltage overhead on the red LED paths is wasted, usually as heat generated on a bias resistor.

The common cathode topology as shown in FIG. 1A, by using different power sources for red, green, and blue LEDs, allows selecting a power supply voltage that closely matches the forward voltage of LEDs of a particular color. Consequently, the red LED may use a power supply voltage lower than that of the green or the blue LED, reducing the power consumption in the red LED path.

Figure 1B:
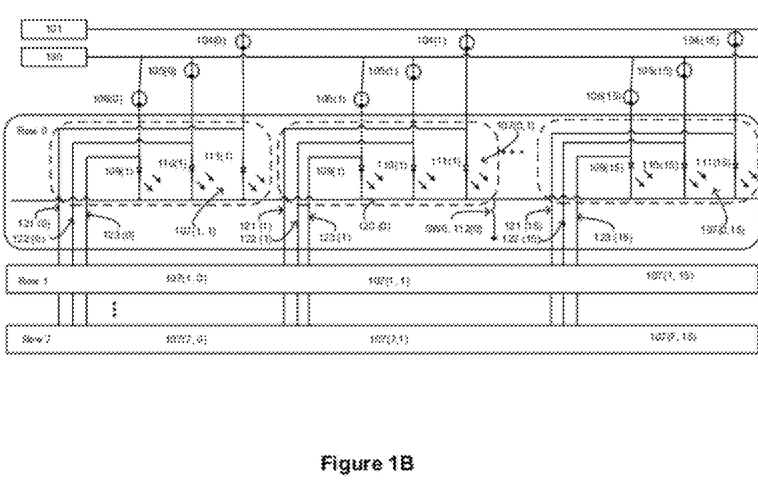
FIG. 1B is a diagram illustrating another embodiment of an LED array according to the current disclosure.

FIG. 1B shows another embodiment according to the current disclosure. The same numerals in FIG. 1A and FIG. 1B refer to the same components or devices. In the embodiment of FIG. 1B, the power source 130 ($P_{GB}$) supplies voltage $V_{DD-GB}$ for both the green LED common anode nodes and the blue LED common anode nodes. In this configuration, only two power sources are required to power the RGB LED units, one for powering the red LEDs, and the other for powering both the green and the blue LEDs.

In the embodiments of FIGS. 1A and 1B, each common cathode node 120 is connected to a switch (not shown). When the switch between neighboring rows are turned on, the voltage applied to the neighboring pixel pitches of those rows are equalized. As a result, those two pixels will display the same color and shade. When all the switches are turned on, the pixels of the whole column will display the same color and shade. When all the switches are turned off (left open), all pixel pitches will display independently.

Figure 1C:
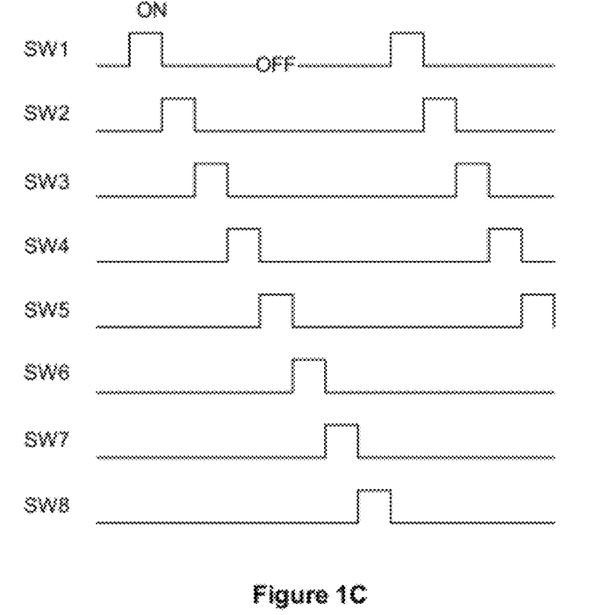
FIG. 1C is a timing diagram for embodiments shown in FIG. 1A and FIG. 1B.

These switches are usually turned ON or OFF according to certain sequences. FIG. 1C is the timing diagram for SW0, SW1, SW2, . . . SW7 in a scan mode of operation, which illustrates such a sequence. According to FIG. 1C, switch SW0 is turned on for a period of time Δ_on, then at the end of Δ_on period, SW0 is turned off and SW1 is turned on, then for the same period of time Δ_on, SW1 remains on during that period, then at the second end of Δ_on period, SW1 is turned off and SW2 is turned on for the same period of time Δ_on, SW2 remains on during that period, then at the third end of Δ_on period, SW2 is turned off, etc., until at the end of the seventh end of Δ_on period, SW6 is turned off and SW7 is turned on for the same period of time Δ_on. Therefore, only one among SW0 to SW7 are on at any given time and each of the SW0 to SW7 have the same duty cycle.

As a result, no more than one switch is on at any given time. The constant current driver supplies only one row of RGB LED units at any given time. Therefore, both the capacity and the cost of the constant current driver can be significantly reduced. If the scan frequency is high enough, human eyes are not able to discern the ON/OFF states and the visual quality is not affected.

A node that a switch turns on or off is often called a scan line and the switches are often called scan switches. In the embodiment of FIG. 1A and FIG. 1B, the common cathode nodes correspond to scan lines.

Many variations of the above described embodiments are available. For example, a pixel pitch of the LED panel may comprise one RGB LED unit, or several LEDs of the same or different colors (e.g., white, yellow, or any color LEDs available on the market). The LEDs in different pixel pitches may also have the same or different colors.

The array of LEDs can be arranged into a variety of geometric shapes, either two-dimensional such as rectangular or circular, or three-dimensional such as cylindrical or spherical. In LED display panels, when LEDs are used as pixel pitches, the distances between two adjacent pixel pitches in the same row can be same or different. Likewise, the distances between two adjacent pixel pitches can be same or different.

The LED array disclosed herein can be readily scaled up. The LED array can have many rows and columns, e.g., 256 rows by 256 columns. Such LED arrays can be used as an LED display panel by themselves or used as a sub-module in a larger LED display panel. For example, an LED display panel can be composed of 120×135 sub-modules of the 16×8 LED arrays, resulting in a resolution of 1920×1080.

The LED panel disclosed herein can also be used in a backlighting device for an LCD display, or in other circumstances to display images or to provide backlight.

Figure 2:
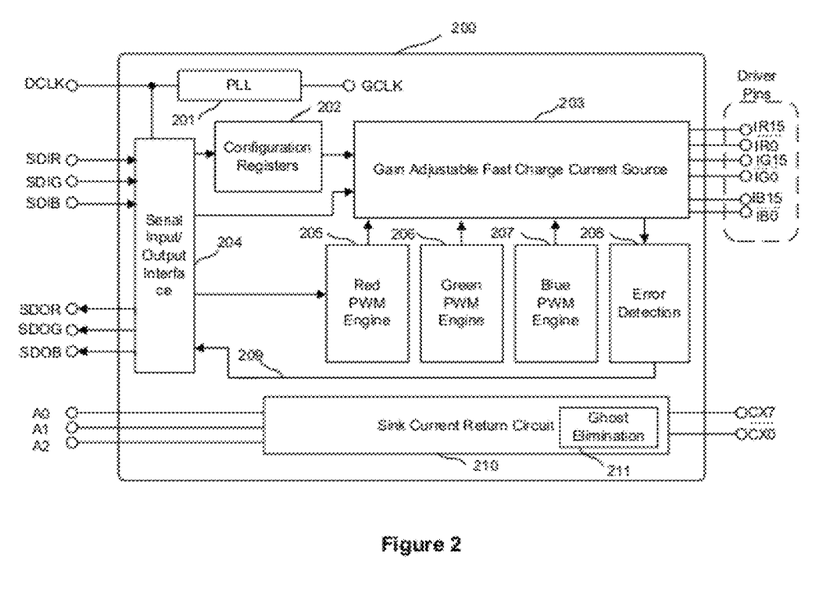
FIG. 2 is a diagram illustrating an embodiment of an integrated circuit of an LED driver, i.e., an LED driver IC.

FIG. 2 is a schematic diagram an LED driver circuit of the present disclosure. Each functional block in FIG. 2 represents one or more circuits and accomplishes one or more functions as disclosed in the following sections. The circuits can either be discrete components on a PCB, or be integrated on a chip. Individual circuits in the driver IC can be constructed by one skilled in the art according to known methods using known parts, or in accordance with methods and devices provided in this disclosure. For the purpose of illustration, the LED driver circuit of FIG. 2 drives a 16×8 array of RGB LED units, i.e., sixteen LED channels and eight scan lines. Such a driver circuit may drive LED arrays of different sizes.

According to one embodiment of the current disclosure, the driver IC comprises the functional blocks encircled in box 200. As shown in FIG. 2, such functional blocks include an on-chip phase locked loop (PLL) 201, a serial input/output interface 204, a configuration register block 202, a gain adjustable fast charge current source circuit 203, an error detection circuit 208, three pulse width modulation (PWM) engines (red PWM engine 205, green PWM engine 206 and blue PWM engine 207), a return sink current circuit 210 and a ghost elimination circuit 211.

The on-chip PLL block 201 generates an accurate and high frequency global clock signal GCLK. It may do so by having an internal GCLK (global clock buffer) or by receiving external GCLK signals sent by a user. The global clock signal serves as the clock input for the PWM engines 205, 206 and 207 within the driver IC. The DCLK (dot clock) serves as a input reference clock for the PLL. Integrating the PLL into the driver IC reduces the PCB layout requirement for high speed lines otherwise required when the PLL is on the PCB, physically separated from the LED driver IC.

The serial I/O interface block 204 is used to load driver IC settings into the configuration register block 202, to load gray scale values to the PWM engines (205, 206 and 207), and to load DOT correction settings into the memory within the gain adjustable fast charge current source circuit 203. It is also the interface to read out configuration settings from the configuration registers 202 and the error status from the error detection circuit 208. SDOR, SDOG, and SDOG are serial data outputs that are connected with SDIR, SDIG, and SDIB (serial data input to a shift register) of an adjacent driver IC.

The configuration register block 202 stores the various settings for the LED driver IC. These settings are defined as a 16-bit register for each color channel, e.g., red, blue and green.

The gain adjustable fast charge current source circuit 203 is implemented to provide a stable current source output based on the PWM signal from the PWM engines 205, 206 and 207. The current source circuit 203 is designed to improve the current respond time. The output current from the current source circuit 203 is adjusted based on the driver setting. There are two levels of gain adjustments: one is a global adjustment per color, the other is a DOT correction adjustment per output channel. The fast charge circuit 203 is further illustrated in FIG. 3 and discussed below.

The error detection circuit 208 monitors the 48-channel output from the current source block 203 to detect short circuit and report the status back to the serial I/O interface block 204. During the operation, if there is a short within an LED, the voltage drop across the LED will become minimal. The error detection circuit will detect that the voltage drop is lower than the short threshold and flag a short LED. In one embodiment, the configuration register may be set to switch off a channel's output when a short within an LED is detected. According to another embodiment, the error detection circuit will simply report the error through status line 209.

The PWM engines 205, 206, 207 are responsible for generating PWM pulses for each of the 16 channels. For each channel, it loads eight 16-bits gray scale values, one per each of the eight scan line. The PWM engines output PWM pulses with the width of the pulse matching the gray scale set to the channel. For a single channel, the PWM engine circuit output loops through all the eight scan lines and provides gray scale output level ranging from 0 to 65535 (i.e., $2^{16}$). The operation of a PWM engine is further explained in FIG. 4.

The driver IC further comprises a sink current return circuit 210. The sink current return circuit 210 comprises a 3-8 decoder. It takes scan line address signals A0, A1, and A2 and translates them into a single scan line switch input signal, one among CX0 to CX7, to control scan switches. For example, when the driver IC of FIG. 2 is connected with the LED arrays of FIG. 1A or FIG. 1B, CX0 to CX7 match and control scan switches SW0 to SW7.

The scan line selection time matches the same scan line PWM pulse within a single refresh cycle in the PWM engine. For example, when CX1 switches SW1 on, all current from sixteen channel of LEDs on scan line 1 are returned through CX1. When CX1 is switched off, the scan line selection is effectively turned off for scan line 1, shutting off all LEDs on scan line 1.

The embodiment of driver IC according to FIG. 2 may comprise a ghost image cancellation logic 211 in the sink current return circuit 210. Ghost effect occurs due to the residual capacitance across the switches when the switches are switched off. After CX switches a scan switch off, the effective capacitance across the switch may cause the LED to be on for a short period of time. The ghost image cancellation logic is implemented to pull up the voltage on scan switch and to cancel the ghost effect.

Figure 3:
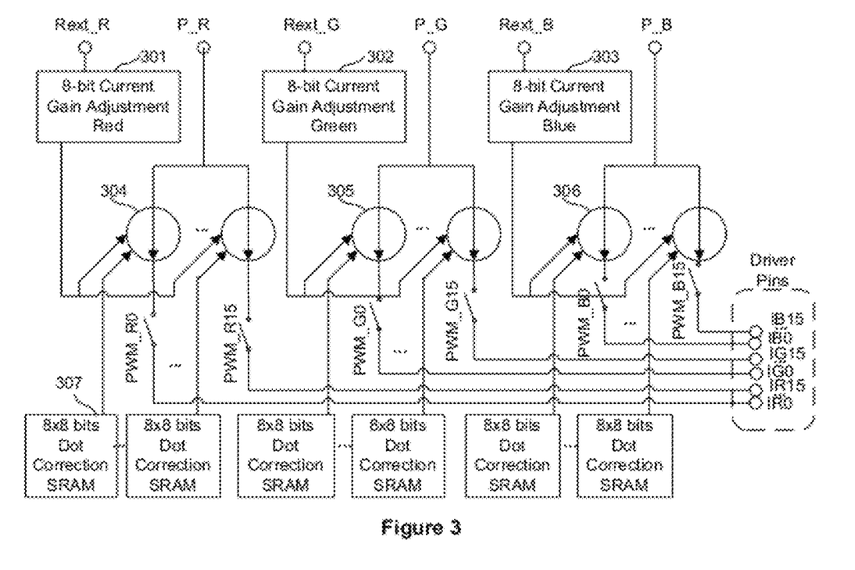
FIG. 3 is a diagram of an embodiment of a gain adjustable current source circuit.

FIG. 3 is a diagram of the gain adjustable current source circuit. It comprises three global gain adjustment circuits (red 301, green 302, and blue 303), 16×3 dot correction adjustment circuit 307 (16 channels red, 16 channels green, 16 channels blue), and 16×3 channels of fast charge circuits 304 (red), 305 (green), and 306 (blue). Rext_R, Rext_G, and Rext_B are external resistors connecting the global gain adjustment circuits and ground for setting up output current for the output channels.

P_R, P_G, and P_B are power sources for red, green, and blue LEDs respectively. Each of them are connected to sixteen fast charge circuits for LEDs of the same color. Each of the fast charge circuit can generate a constant current and can be connected to an output pin, controlled by the PWM engine. Consequently, there are 16 pins for color red: IR0 . . . IR15, 16 pins for color green: IG0 . . . IG15, and 16 pins for color blue: IB0 . . . IB15. Note that if the driver IC comprising the circuit of FIG. 3 is used to drive the LED panel of FIG. 1A, P_R, P_G, and P_B would respectively correspond to 101, 102, and 103 in FIG. 1A, while fast charge circuits 304, 305, and 306 would respectively correspond to constant current drivers 104, 105, and 106.

The global gain adjustment setting for LEDs of a same color is an 8-bit value loaded from the configuration register. This 8-bit value modifies the current output level for all 16 channels of LEDs of the same color. For example, if the global gain adjustment setting for red is set to 50%, output current from all 16 channels of red, IR0 through IR15, will be reduced by 50%, the adjustment applies to output of all scan line selection.

The DOT correction 307 applies its gain adjustment to the specific scan line of corresponding channel. At output time, for a specific scan line, an 8-bit DOT correction value is loaded to adjust the channel current. When moving to the next scan line selection, another DOT correction value is loaded to change the channel output current accordingly. The DOT correction values were loaded when the controller configures the LED driver.

The fast charge circuits 304, 305, and 306 are designed to improve the response time of the driving current. For example, in a time-multiplexing LED display channel topology, each output channel of the driver is connected to multiple LEDs. Each LED may contribute an nonnegligible capacitive load to the driver and such capacitance hinders the sharp rise of the LED driving current. The LED response time is slowed down as a result of such capacitance, it further limits gray scale resolution and overall display resolution. The fast charge circuit creates a sharper rising slope for the LED current when the channel PWM is turned into high state. This allows the LED driver to drive LED at a much higher frequency than a typical common cathode LED driver design.

Figure 4:
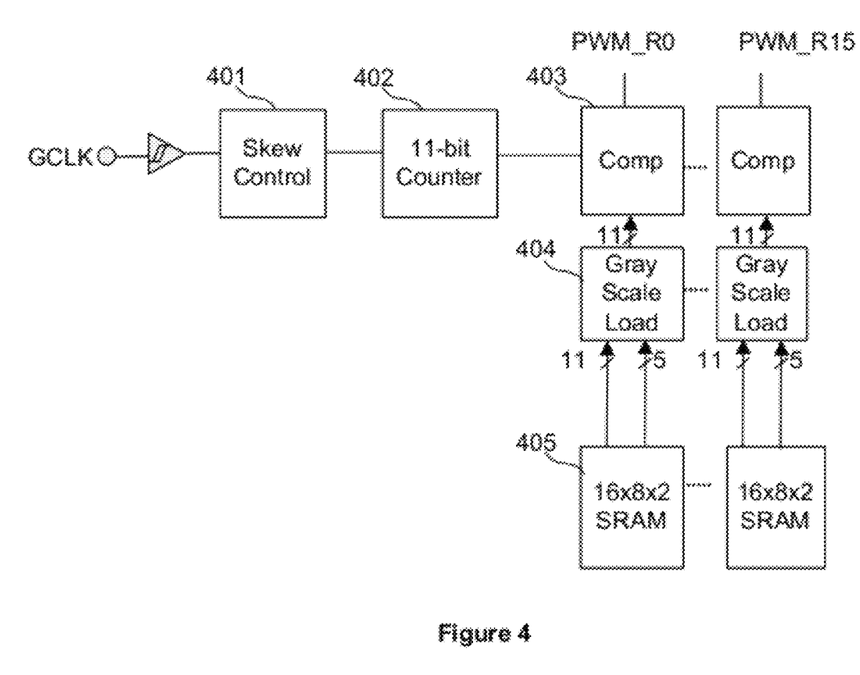
FIG. 4 is a diagram of an embodiment of a pulse width modulation (PWM) engine.

FIG. 4 is a block diagram of an embodiment of a PWM engine, which comprises a skew control 401, an 11-bit counter 402, sixteen sets of SRAMs 405, gray scale loading circuits 404, adders and comparators 403.

The gray scale value for each LED is loaded through the serial I/O interface block 220. Each gray scale is a 16-bit value, corresponding to the 65536 levels of gray scale supported by the PWM circuit. To support 16×8 red LEDs, an SRAM of 16×8×16 is required. In FIG. 4, a 16×16×16 SRAM is used for the red LEDs. This ensures that while the current set of gray scales is being translated into the PWM circuit, the next set of gray scale values can be loaded at the same time. When the current set of gray scales are fully realized, the next scale is readily available for use.

Figure 5:
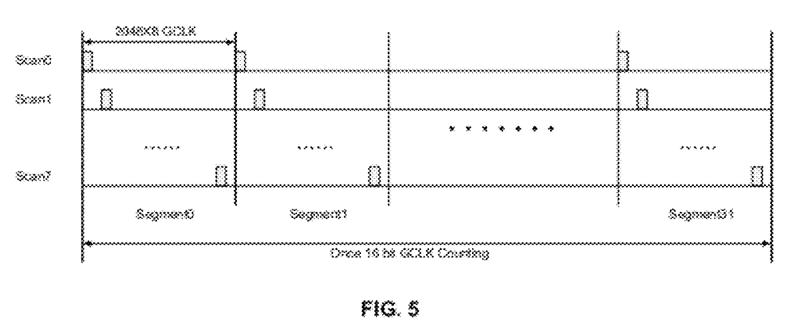
FIG. 5 is a timing diagram illustrating the operation of a PWM engine.

The PWM engine is used to drive LEDs in thirty two refresh segments (i.e., segment 0 through segment 31) as illustrated in FIG. 5. During each refresh segment, each of the eight scan lines, scan0 through scan7, is driven once and the LEDs on each scan line is refreshed once. For each channel of a single scan line, the 16-bit gray scale value is split into two parts. Using the PWM engine designated for red LEDs (i.e., red LED PWM engine) as an example, the upper 11-bit value corresponds to the number of GCLKs that the red LED shall be on within a single refresh segment. The lower 5-bit value is realized through thirty two refresh segments. The gray scale loading circuit adjusts the 11-bit for each refresh segment based on the lower most 5-bit value of the 16-bit gray scale value. The final output of the gray scale loading circuit is an 11-bit value, which is then sent to a comparator. The comparator receives another input from an 11-bit counter. The 11-bit counter with the GCLK starts counting when the gray scale value is loaded. The 11-bit value from the GSL is the target clock counter limit.

The PWM_R0 becomes "on" as long as the output from the 11-bit counter is less than the target clock counter limit. Once the counter output value equals to the target clock counter limit, PWM_R0 is shut off. This is done for all sixteen channels for red LEDs according to its target counter limit. The 11-bit counter will continue to increase until it overflows to zero. At that point, it continues the PWM generation for the next scan line. The process of counting another 11-bit value is repeated for next seven scan lines. When all eight scan lines, scan0 through scan7, have gone through such process of generating PWM, a single refresh segment is completed for the a group of 16×8 red LEDs. It is noted that all operations for green LED and blue LED PWM engines are functioning the same way as the red LED PWM engine.

The PWM circuit also provides skew control across channels. By setting skew across different drive channels, it displaces the rising edge of drive current from channel to channel, effectively lower the EMI effect.

Many modifications and other embodiments of the disclosure will come to the mind of one skilled in the art having the benefit of the teaching presented in the forgoing descriptions and the associated drawings. For example, the driver IC can be used to drive an LED array in either common cathode or common anode configuration. Elements in the LED array can be single color LEDs or RGB units or any other forms of LEDs available. The driver IC can be scaled up or scaled down to drive LED arrays of various sizes. Multiple driver ICs may be employed to drive a plurality of LED arrays in a LED display system. The components in the IC can either be integrated on a single chip or on more than one chips or on the PCB board. Such variations are within the scope of this disclosure. It is to be understood that the disclosure is not to be limited to the specific embodiments disclosed, and that the modifications and embodiments are intended to be included within the scope of the dependent claims.

What is claimed is:

1. A driver circuit for LEDs, comprising:
   a phase lock loop;
   a pulse width modulation engine;
   a configuration register;
   a gain adjustable fast charge current source; and
   a serial input/output interface,
   wherein the phase lock loop, operatively connected to the serial input/output interface, provides a global clock signal,
   wherein the pulse width modulation engine, operatively connected to the serial input/output interface, receives gray scale values from the serial input/output interface and a global clock signal from the phase lock loop, and generates a PWM signal embedded with the gray scale values for the gain adjustable fast charge current source,
   wherein the configuration register, operatively connected to serial input/output interface and gain adjustable fast charge current source, stores driver circuit settings,
   wherein the gain adjustable fast charge current source, operatively connected to the configuration register, the serial input/output interface, and the PWM engine, provides a current output to drive an LED array, wherein the LED array is arranged in a common cathode configuration, wherein anodes of a plurality of LEDs are connected to a common anode node, wherein the common anode node is operatively connected to the gain adjustable fast charge current source,
   wherein the serial input/output interface, operatively connected to the phase locked loop, the configuration register, the PWM engine, and the gain adjustable fast charge current source, provides a driver circuit setting to the configuration register, provides a gray scale value to the pulse width modulation engine, and provides a global gain adjustment setting to the gain adjustable fast charge current source,
   wherein the gain adjustable fast charge current source comprises a power source, a fast charge circuit powered by the power source, a global gain adjustment circuit for adjusting a gain of the fast charge circuit, and an on-off switch operatively connecting the fast charge circuit to the LED array,
   wherein the global gain adjustment circuit is operatively connected to an external resistor, and
   wherein the on-off switch is controlled by the PWM signal.

2. A driver circuit for LEDs, comprising:
   a phase lock loop;
   a pulse width modulation engine;
   a configuration register;
   a gain adjustable fast charge current source; and
   a serial input/output interface,
   wherein the phase lock loop, operatively connected to the serial input/output interface, provides a global clock signal,
   wherein the pulse width modulation engine, operatively connected to the serial input/output interface, receives gray scale values from the serial input/output interface and a global clock signal from the phase lock loop, and generates a PWM signal embedded with the gray scale values for the gain adjustable fast charge current source,
   wherein the configuration register, operatively connected to serial input/output interface and gain adjustable fast charge current source, stores driver circuit settings, wherein the gain adjustable fast charge current source, operatively connected to the configuration register, the serial input/output interface, and the PWM engine, provides a current output to drive an LED array, wherein the LED array is arranged in a common cathode configuration, wherein anodes of a plurality of LEDs are connected to a common anode node, wherein the common anode node is operatively connected to the gain adjustable fast charge current source, wherein the serial input/output interface, operatively connected to the phase locked loop, the configuration register, the PWM engine, and the gain adjustable fast charge current source, provides a driver circuit setting to the configuration register, provides a gray scale value to the pulse width modulation engine, and provides a global gain adjustment setting to the gain adjustable fast charge current source, and wherein the pulse width modulation engine comprises a skew control for displacing a rising edge of the current output, a counter, a SRAM that stores a gray scale data and a DOT correction data, a gray scale loading circuit, and an comparator for generating the PWM signal.

* * * * *